Aug. 30, 1932.    J. G. TILP    1,875,186
ELBOW MAKING MACHINE
Filed Dec. 24, 1929    7 Sheets-Sheet 1

J.G.Tilp
INVENTOR
BY Victor J. Evans
ATTORNEY

Aug. 30, 1932.  J. G. TILP  1,875,186
ELBOW MAKING MACHINE
Filed Dec. 24, 1929    7 Sheets-Sheet 2

Aug. 30, 1932.   J. G. TILP   1,875,186
ELBOW MAKING MACHINE
Filed Dec. 24, 1929   7 Sheets-Sheet 3

J. G. Tilp
INVENTOR
BY Victor J. Evans
ATTORNEY

Aug. 30, 1932.    J. G. TILP    1,875,186
ELBOW MAKING MACHINE
Filed Dec. 24, 1929    7 Sheets-Sheet 5

J. G. Tilp
INVENTOR
BY Victor J. Evans
ATTORNEY

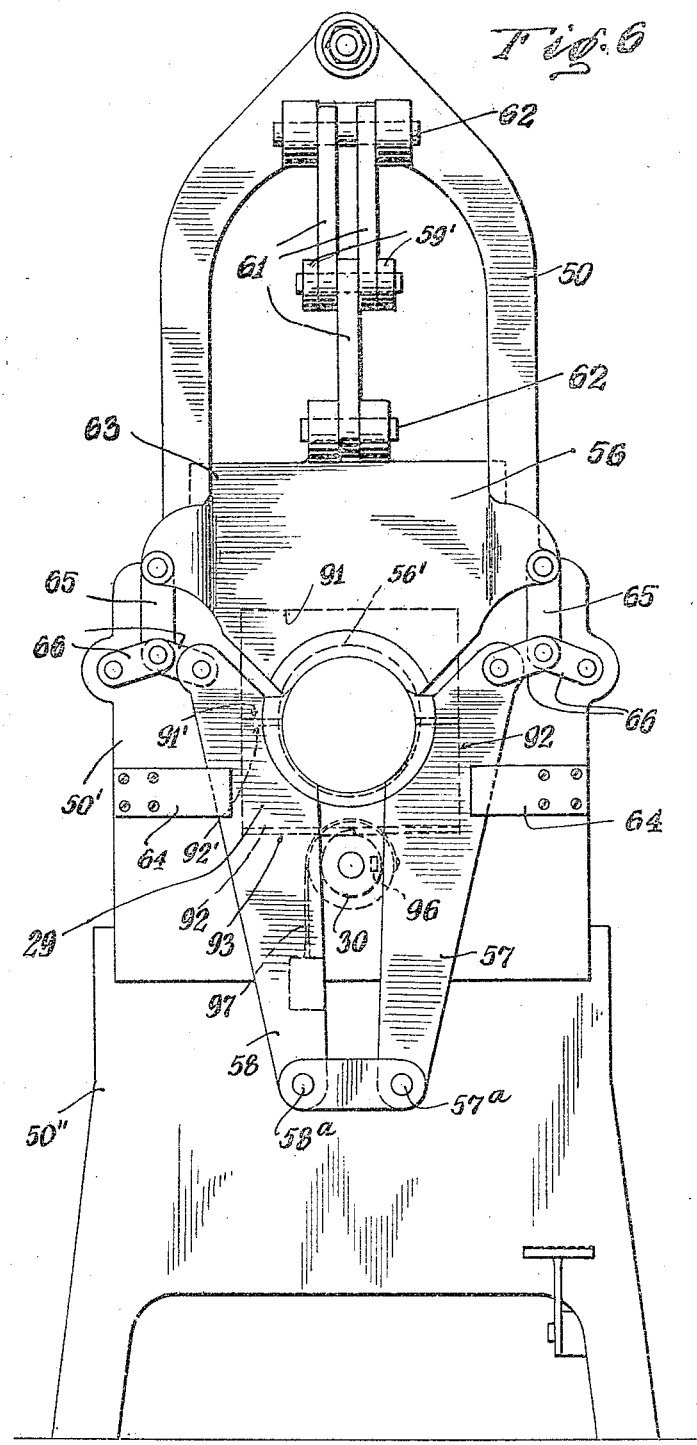

Aug. 30, 1932.  J. G. TILP  1,875,186
ELBOW MAKING MACHINE
Filed Dec. 24, 1929  7 Sheets-Sheet 7
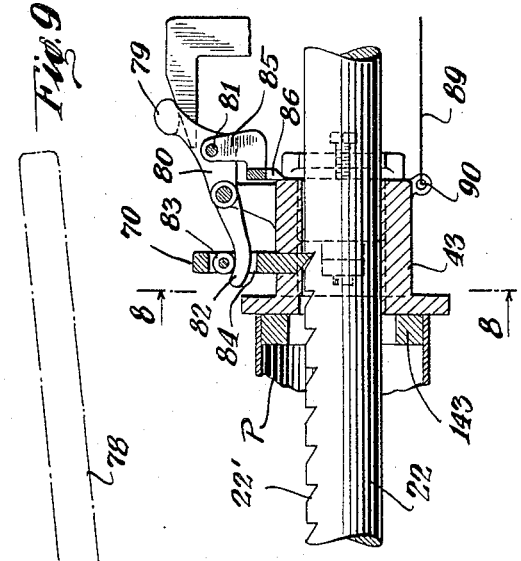
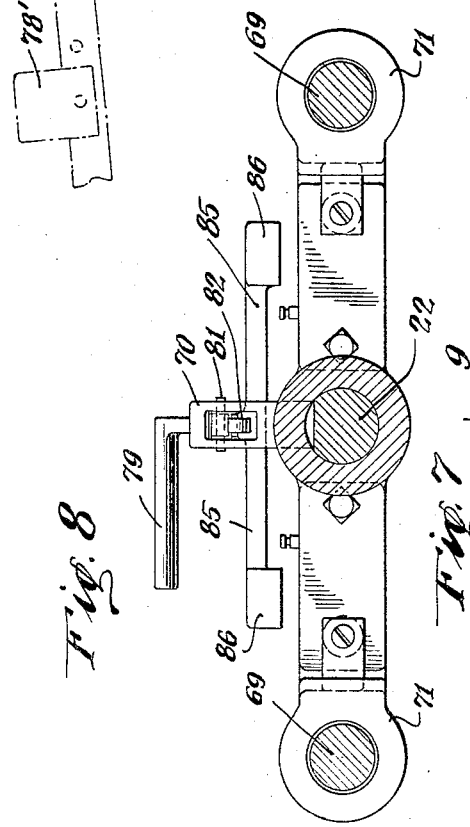
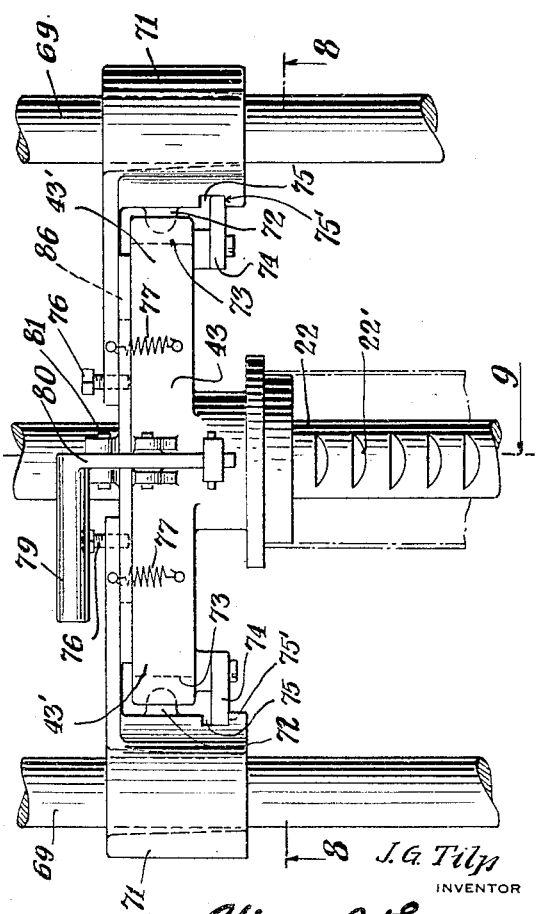
J. G. Tilp
INVENTOR
BY Victor J. Evans
ATTORNEY Patented Aug. 30, 1932

1,875,186

UNITED STATES PATENT OFFICE

JOSEPH GEORGE TILP, OF MAPLEWOOD, NEW JERSEY, ASSIGNOR TO DAVID LEVOW, OF NEW YORK, N. Y.

ELBOW-MAKING MACHINE

Application filed December 24, 1929. Serial No. 416,243.

This invention aims to provide a novel and improved machine for bending pipe lengths into elbows of various angularities as desired.

A veritable multitude of machines, more or less automatic, have been proposed for the general purpose of creasing a straight length of pipe at a point or at a plurality of spaced points along the length thereof in order to give a greater radius of curvature to the creased side of the pipe and a lesser radius of curvature to the opposite side of the pipe. In other words, prior practice in the art, as evidenced by a large number of issued U. S. patents, many important ones of which have expired, have made it standard, accepted practice thus to crease a pipe length to fabricate a desired elbow, as for a water-pipe coupling and other conduits for divers purposes. For example, it is standard, accepted practice to provide a creasing tool or tools operable in a working zone at a fixed location relative to the path of endwise advance of the pipe past such location. Also, it is standard, accepted practice to use a plurality of separate tools all operated in such manner as to co-act to form a predetermined crease in the pipe transversely, or more or less completely circumferentially of the pipe. Further, it is the standard, accepted practice to support the portion of the pipe at any instant being subjected to a creasing operation, between innner and outer guides and/or supports; with the inner support generally a drum or thickened disc having a recess or pocket therein within which the material of the pipe-crease is to be forced by the creasing tool or tools, and into which pocket or recess said material is thus forced by said tools as a double wall sub-structure having more or less in cross-section the shape of a U, a V, or an I, and having a general central line, in the direction of its height, substantially perpendicular to the axis of the pipe. Again, it is standard, accepted practice to shape the crease-receiving recess or pocket (or otherwise to provide a suitable female die means, as an equipment on or as a coadjuvant of said drum), and in connection therewith to allow for a movement of said drum axially thereof at a predetermined instant, to insure that, at the conclusion of such movement of the drum, the previously upstanding, or rather instanding, crease will have been bent as though about a fulcrum and flattened in close against the inside of the pipe wall, thus reaching a stage in the pipe-bending operation whereat, if another crease is to be given to the pipe-length to produce the desired elbow, the pipe-length may be fed forward the predetermined distance to advance the flattened crease beyond the zone of operation of the creasing tool or tools and to advance a succeeding and as yet uncreased portion of the pipe into said zone. Again, it is standard, accepted practice to provide a reciprocator rod or the like carrying at its forward end the thickened disc or drum aforesaid, and on a rearward portion thereof, some distance back from the zone of operation of the creasing tool or tools, a member or structure adapted predeterminedly to move with, or to move relatively to, the reciprocator; which member or structure may perhaps most aptly be designated the pipe-advancing abutment or carriage, but is hereinafter for convenience simply called the carriage. It is also standard, accepted practice for this carriage (against the forward face of which the inner end of the pipe to be creased is placed, when the carriage is the proper distance towards the rear end of the reciprocator and away from the zone of creasing, that is, when the machine is set to start bending a pipe-length) to be advanced a given distance along the reciprocator during each stroke of the latter toward the creasing zone, but to halt each time the reciprocator, reaching the end of its forward stroke, commences its rearward stroke, and to rest during the whole of said rearward stroke; thereby insuring that on each forward stroke of the reciprocator the pipe will be advanced a distance roughly approximating the space between each two creases, and yet insuring that the following retraction stroke of the reciprocator will not cause the carriage and the pipe-length to "lose ground", in other words, to prevent a back stroke of the reciprocator from undoing the beneficial pipe-feeding action of the just preceding forward stroke of the reciprocator.

Further, it is standard accepted practice to provide, for attaining the purposes just mentioned, a carriage movable along a plurality of parallel guides one of which is the reciprocator which co-acts with the carriage to provide a rack and pawl means to insure that each forward stroke of the reciprocator will advance the carriage for pipe-feeding as above, and another of which is associated with or co-acts with a holding, gripping or clinching means on or connected to the carriage and so operating that during a forward stroke of the reciprocator the carriage moves forward freely along the last-mentioned guide but on the succeeding retraction stroke of the reciprocator the carriage is held fixed with the other guide and hence the reciprocator moves backward and relatively to the carriage during its entire retraction stroke; the combination just described, which is the combination preferably incorporated in the present machine, being fully illustrated and described in U. S. Patent to Naylor No. 1,032,152. Again, it is standard, accepted practice to provide a trip or the like for rendering the rack and pawl means just referred to, inoperative, at the conclusion of the final one of the predetermined plurality of creasings for a pipe-length, and to hold such rack and pawl means inoperative for a predetermined interval thereafter, that is, until the carriage has been returned to a position on the reciprocator and toward the rear end of the auxiliary guide; such position being that predetermined for the carriage before a new pipe-length is to be inserted in the machine for beginning of a pipe-bending operation, and a releasable weight being often used thus to return the carriage when required. Likewise, it is common practice to provide an instrumentality in the vicinity of such return position of the carriage, to restore to normal operability the rack and pawl means, and the holding or clinching means above referred to, so that during the bending of this new pipe-length the parts may act as first explained.

In machines having instrumentalities of the kind pointed out in the paragraphs immediately preceding, it has further been customary to provide, as hereinabove mentioned, an outer guide or support for the portion of the pipe at any instant being subjected to a creasing operation; and it has likewise been common to utilize a suitable structure or framework for mounting this outer guide or support. In view of the fact that such guide or support assists in holding the pipe in a way to assist in or facilitate a creasing operation precisely as prevised, such guide or support will hereinafter be termed the working-head.

One of the specific objects of the invention,—it being understood that an underlying object is to improve generally a machine of the type above described,—is to provide an improved working-head characterized by the fact that the same is in a plurality of sections so shaped that when said sections are moved to maximum predetermined adjacency, the pipe portion being creased will receive ideal support from the precise concentricity therewith of said working-head, and yet so shaped and controlled that after a pipe-length is predeterminedly creased said sections, preferably automatically, will separate and remain separated, during the time needed to slip out a finished elbow and insert into the machine a pipe-length to be made into a similar elbow; the arrangement being such that, preferably, the thus separated parts of the working-head are again moved to maximum adjacency just before the new pipe-length is given its first creasing. The attainment of this object obtains a much needed result in the art, as it will be obvious that no time will be lost in removing an elbow pipe-length and inserting a straight pipe-length, and particularly in so far as such insertion is concerned, since then the parts will provide an abnormally large working space and one of course much larger than would be feasible during a creasing operation.

Another object of the present invention is to provide a new and improved collection of creasing tools, characterized by the presence of a radially movable tool for attacking the pipe at the greatest depth of crease, and the conjoint presence and operation of a creasing tool having a movement of rotation rather than a movement of translation, in other words, so that a selected point on its working edge will travel through an arcuate path during creasing, for attacking the pipe at a portion of lesser crease depth; thereby to quickly and perfectly give a considerable crease to the pipe, comparatively easily where the pipe is thick walled or of tough material, and with less danger than heretofore of cracking or injuring the pipe where the material thereof is of unusual brittleness or the crease to be given is of unusual depth.

Another object of the present invention is to provide a machine which may be quickly, easily and conveniently modified, preferably by means of simple re-arrangement of a gear train, so far as is concerned the predetermined number of creases to be given to a pipe-length subjected to the action of the machine.

Another object of the present invention is to provide a machine having a power-input means, perhaps a pulley rotating with a spur-gear fixed thereto, adapted to run continuously despite alternating periods of machine operation and inactivity.

Another object of the present invention is to provide a machine requiring for a predetermined cycle of operations,—as to start creasing a pipe and then continue and complete such creasing at as many different points as prevised and then cease such creasing, and finally restore to starting position the working and connecting and controlling parts which should be restored to such starting position in order to continue and complete the bending of another pipe-length, and to render motionless all the working parts of the machine for a period sufficient to permit a finally bent pipe to be removed and a new pipe to be inserted,—a less number of levers, treadles, handles and the like to be manually operated by the machine attendant, than heretofore.

Another object is to provide in a machine like that last described, a single handle, treadle, lever or the like which when once depressed or otherwise moved once in a single direction may start the machine, supervise the operation of the machine throughout its complete cycle of initiating, continuing and completing a prevised bending of a given pipe length, and return automatically to normal position, substantially coincidentally with the completion of said cycle.

Another object is to provide an automatic means, preferably predeterminedly brought into action as the result of a controlling part manually given a certain movement to start the machine, for so supervising the operation of the machine that there will occur, after a pipe has been given a predetermined number of creases,—first, a stoppage of all the previously working parts of the machine, and, second, a return of a carriage to starting position, and also, if a working-head including a plurality of separable parts is present, a separation of such parts.

Another object is to provide a single manually operable lever, treadle or the like, to start the machine, which, where the machine includes a working-head as last described, will, incidental to its operation in a machine-starting direction, be instrumental in bringing about a closing of such head to the maximum required for a pipe-bending operation, before pipe-bending actually commences.

Other objects and advantages of the invention will be hereinafter specifically pointed out, or will become apparent, as the specification proceeds.

With the above indicated objects in view, the invention resides in certain novel construction and combinations and arrangements of parts, clearly described in the following specification and fully illustrated in the accompanying drawings, which latter show an embodiment of the invention as at present preferred.

Figure 3:
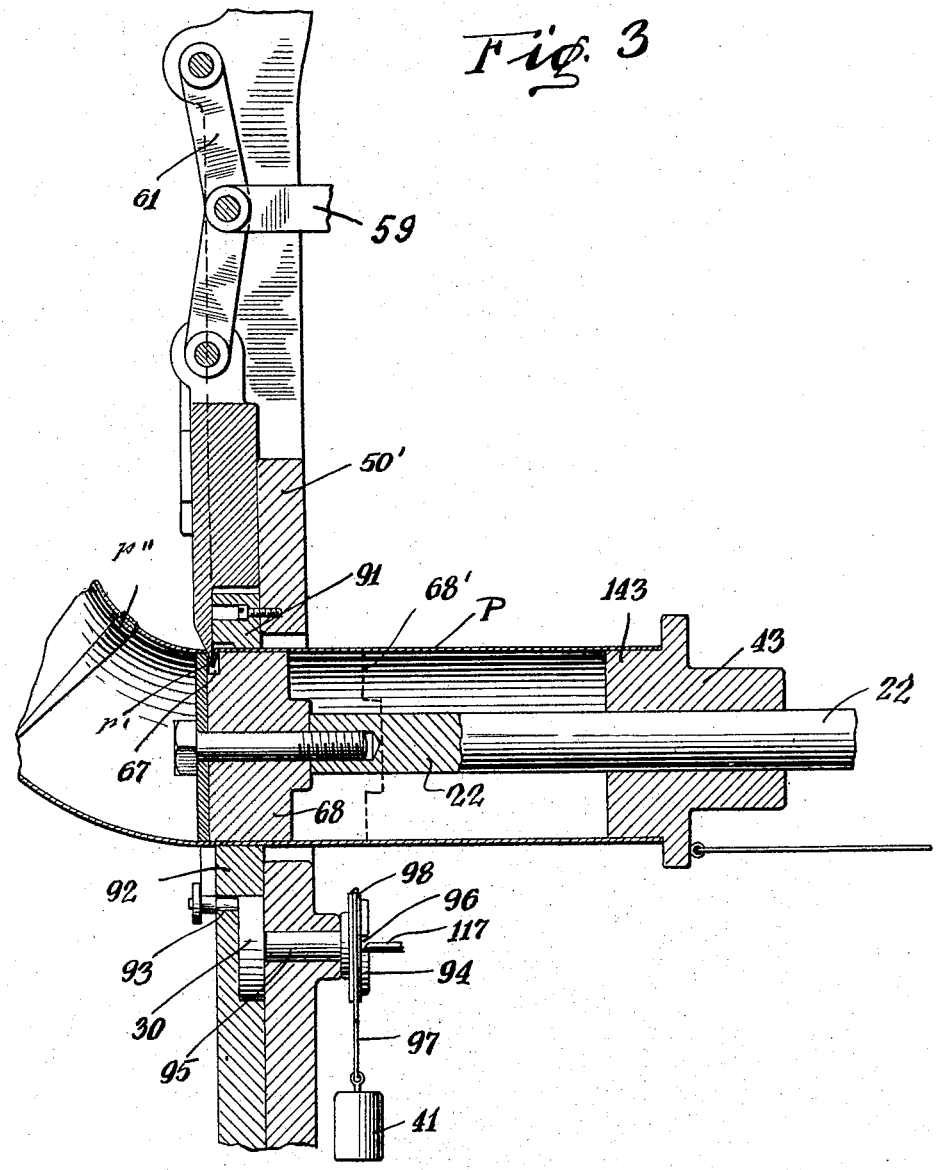
Figure 4:
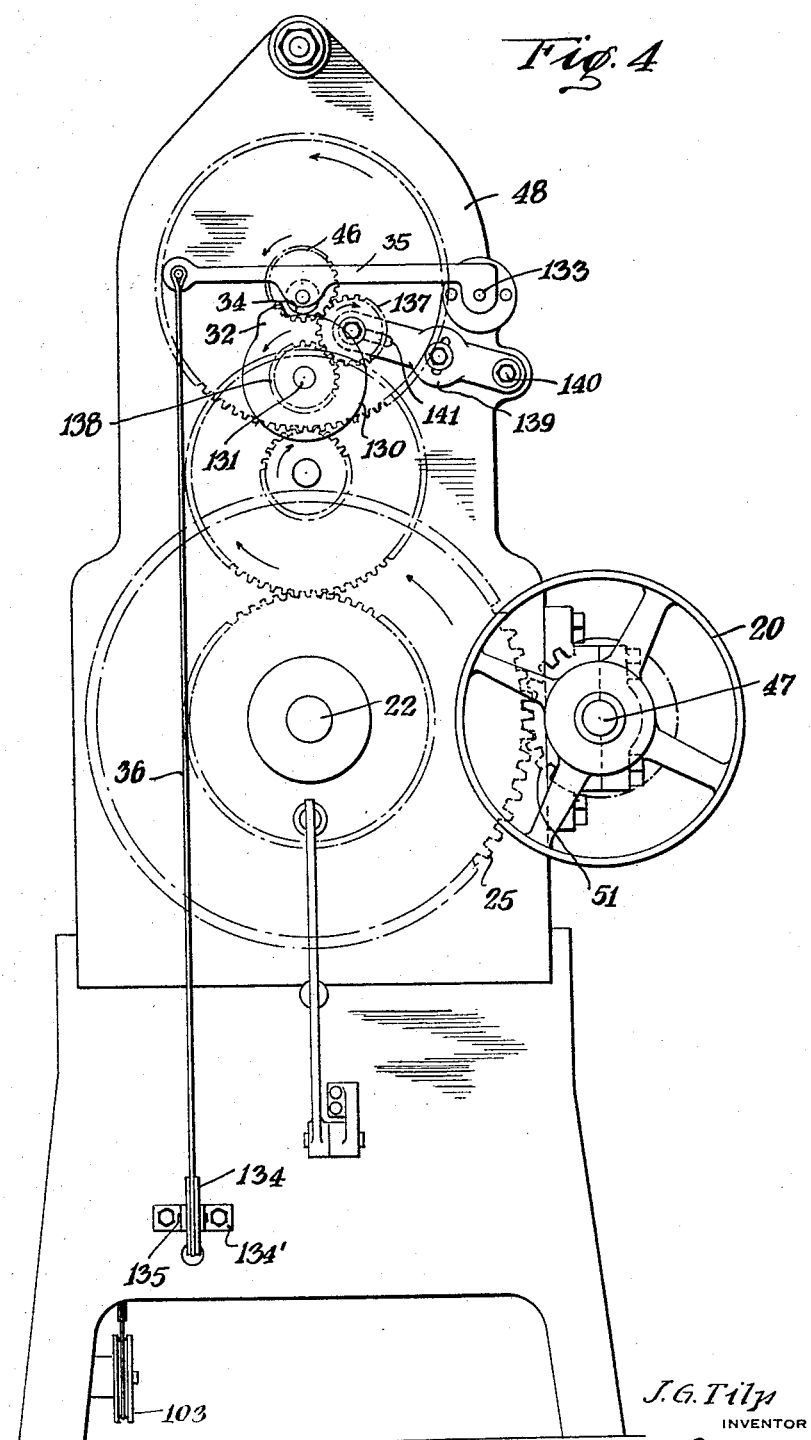
Figure 5:
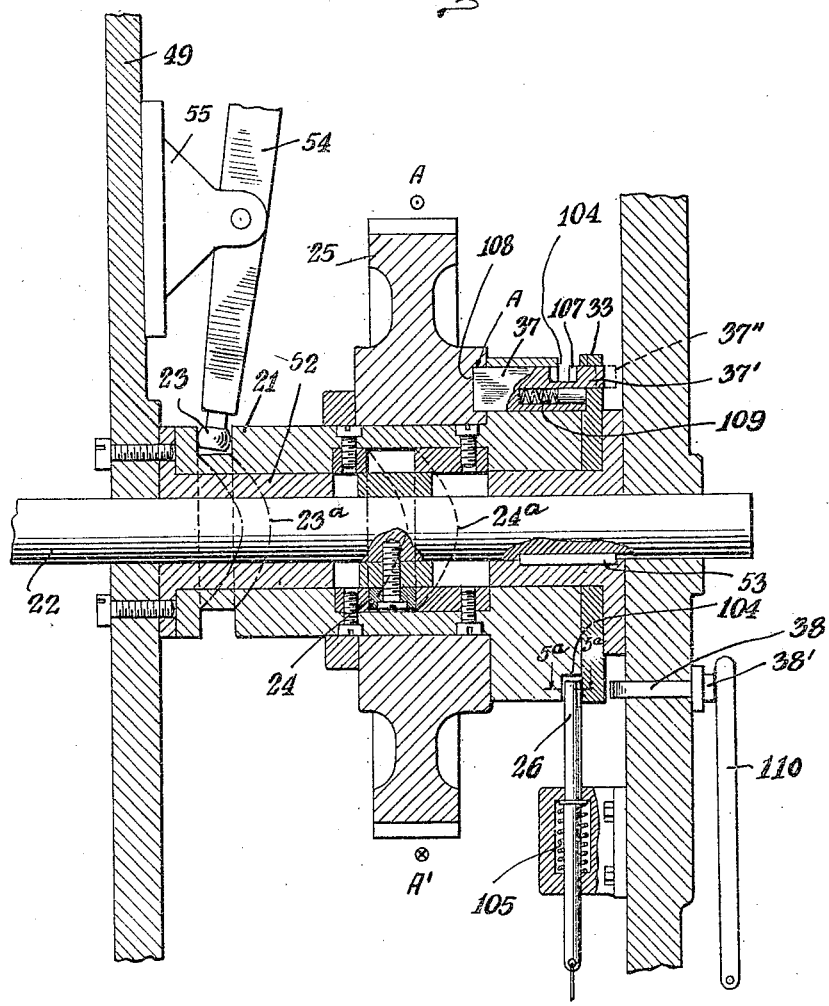
Figure 5A:

Fig. 3 is an enlarged fragmentary vertical sectional view taken through the center of the working-head, showing the latter closed, and showing the reciprocator, the drum on the forward end thereof, a creasing tool forcing a pipe-wall portion into the recess or pocket of said drum, and further showing the carriage which has just previously advanced the pipe to move a completed crease beyond the zone of operation of said tool relative to a part of the pipe-wall now being creased, properly into said zone;

Fig. 4 is a rear elevation of the machine;

Fig. 5 is a view similar to Fig. 3, but showing details of the rear portion of the reciprocator, of the cam-groove carrying sleeve, of the continuously rotated driving gear, of the clutch between said gear and sleeve, and of certain devices, one for predeterminedly operating the clutch, and the other for being predeterminedly operated by the clutch;

Fig. 5a is a horizontal section taken approximately on line 5A—5A of Fig. 5 showing dog 26 in top plan view.

Figure 1:
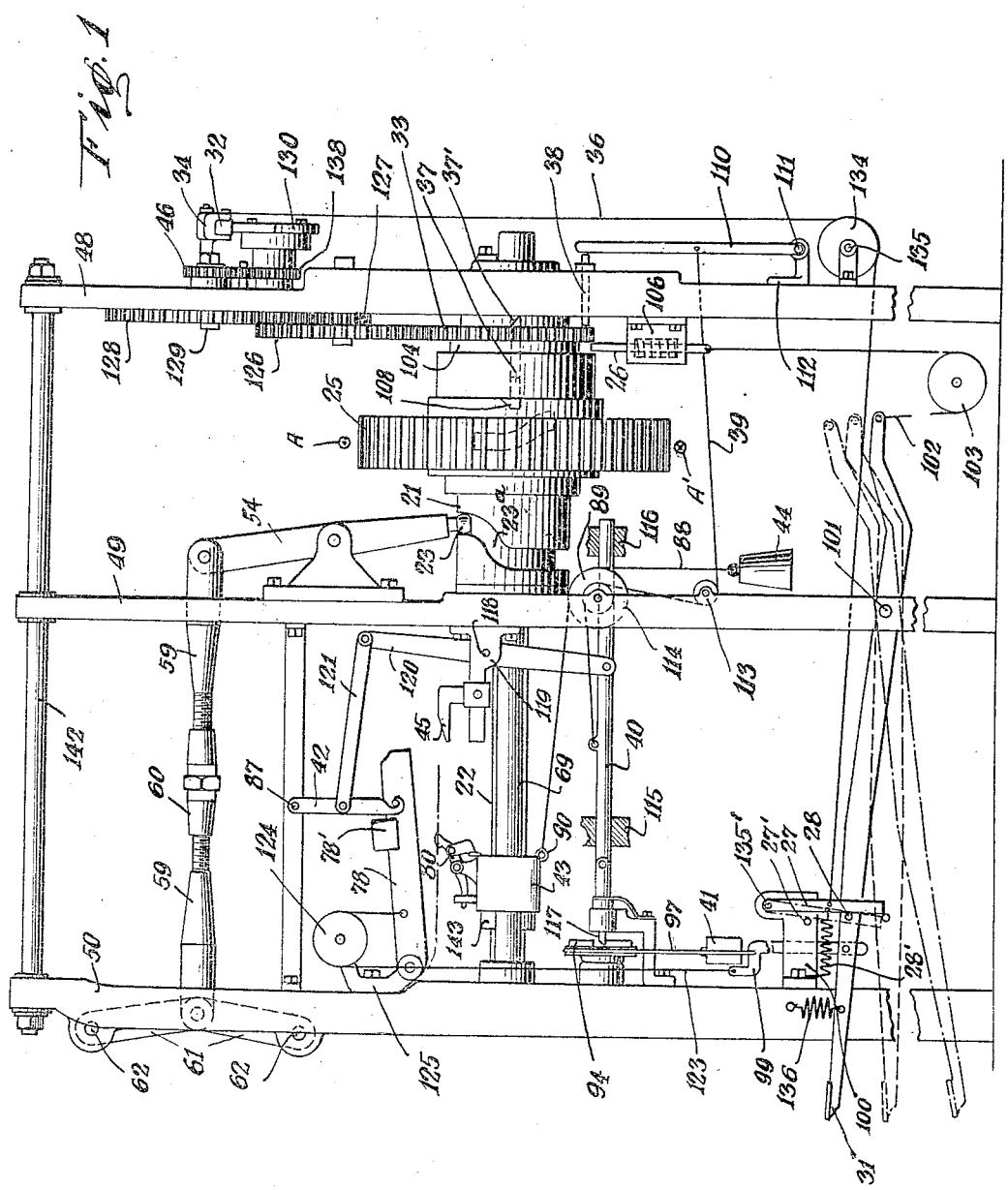
Fig. 1 is a side elevation of said embodiment.
Figure 2:
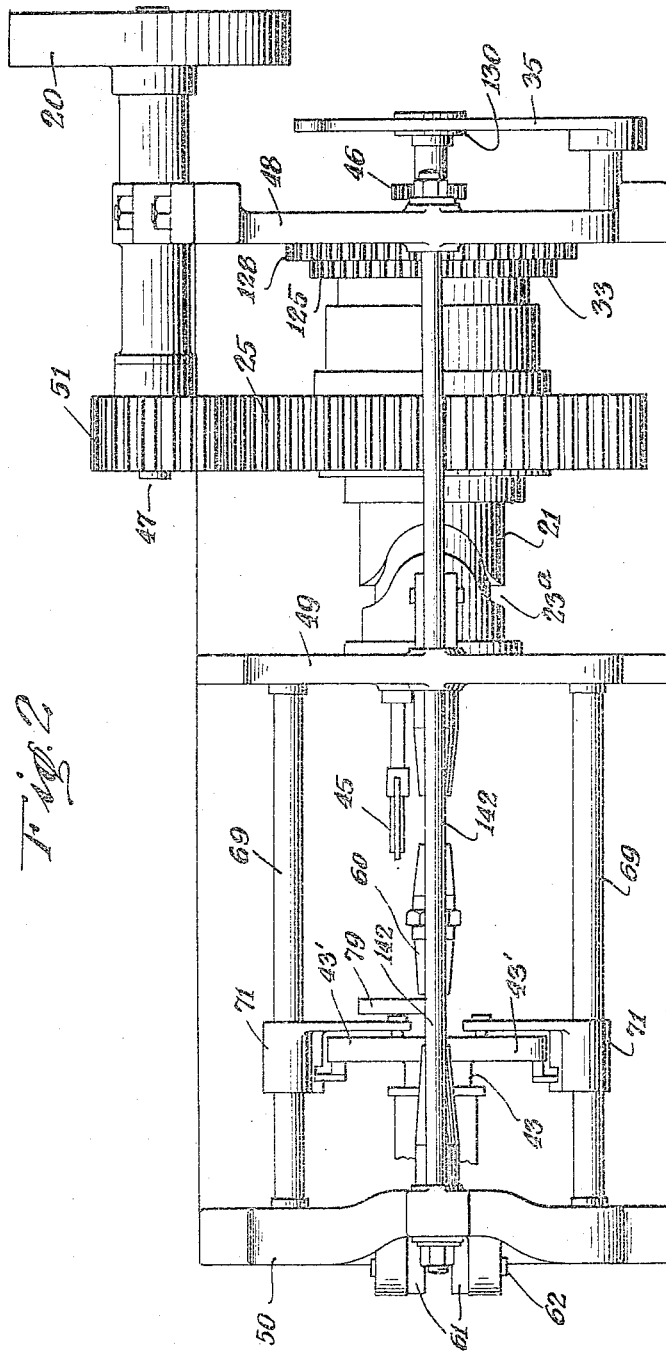
Fig. 2 is a top plan view thereof.

Fig. 6 is a front elevation of the machine;

Fig. 7 is a fragmentary enlarged view showing certain of the parts in the relation in which they appear in Fig. 1, these parts forming the preferred means for controlling relative movements between the carriage and the reciprocator for the purposes aforesaid;

Fig. 8 is a vertical section taken substantially on the lines 8—8 of Figs. 7 and 9;

Fig. 9 is also a vertical section but one taken substantially on the line 9—9 of Fig. 7; and Fig. 10 is a perspective view showing the drum, the recess or pocket therein, and a part of the forward end of the reciprocator.

Similar reference characters refer to similar parts throughout the several views of the drawings.

It is believed that a preliminary exposition of the main and the unique features of the machine, and their outstanding operative relationships, will assist materially in appreciating the invention and its novel advantages and at the same time will serve as an advance summary which will simplify the entire disclosure.

Therefore, as will now be pointed out:

In the preferred embodiment of the machine as illustrated in the drawings just briefly described, the following predeterminedly co-acting mechanisms are present:

(a) A continuously rotated train of gears between a power-input pulley 20 and a sleeve-structure 21 carrying an external cam groove and an internal cam groove;

(b) With both cam grooves so designed that each has only an activating rise and fall through half the circumference of the sleeve-structure,—one of such cam grooves for predeterminedly operating the pipe creasing tool or tools, and the other for predeterminedly operating a reciprocator 22 for serving the useful purpose, among others, of predeterminedly advancing a creased portion of the pipe the required distance beyond the zone of operation of the creasing mechanism in order to bring a succeeding portion of the pipe into such zone,—the parts being arranged so that, on the one hand, the creasing tool or tools make a creasing stroke and an immediately succeeding withdrawal stroke, while the reciprocator, and consequently the pipe operated therewith, are motionless, and so that, on the other hand, said reciprocator will make a full forward stroke and an immediately succeeding retraction stroke, while the creasing tool or tools are motionless,—to which ends the cam grooves aforesaid are constructed as already described and are also arranged diametrically out of phase on the sleeve-structure, that is, with the rise and fall of one cam groove co-acting on its follower 23, while the uniplaner or "straight" half of the other cam groove is passing its follower 24, and vice versa;

(c) Said continuously rotated train of gears having the gear (25) thereof which is applied to sleeve-structure 21, either loose thereon (to rotate idly relative to the sleeve-structure 21 and the working parts of the machine between the time when a bending operation relative to the pipe has been completed and the time when another pipe is to be acted upon to bend the same), or as a driving element for rotating said sleeve-structure therewith, (during such bending operations);

(d) To which end described under (c), there is provided a device, as a dog 26, operable at will, to adjust clutch elements between the gear 25 and sleeve-structure 21 to cause the latter to commence and continue rotating with said gear, until subsequently predeterminedly released—such release of dog 26 here being accomplished by an automatic unsetting of a latch (27, 27' and 28) originally set by the just mentioned operation of dog 26;

(e) A multi-part working-head also being provided, the several sections whereof are relatively movable for co-action then to concentrically embrace the pipe in the vicinity of the creasing zone while a creasing operation is being performed, yet one or more of which sections, as the lower-half section 29, is adapted to be abnormally moved away from the other section or sections, to open up temporarily the passage through said head by way of which a pipe length to be bent may be easily inserted or a pipe length completely bent as prevised may be easily removed,—these opening and closing movements of said working-head being controlled (with proper regard to the rotation or non-rotation of sleeve-structure 21, that is, so that such head will be closed to girth the pipe with small clearance while the latter is being creased, but not otherwise) by a cam 30, operated automatically at the proper times,—such cam in the present case being operated as described incidental to the operation of a pedal 31, which pedal, normally urged to elevated position, is depressed in order to start a pipe bending operation (once a new length of pipe is inserted into the machine) by moving dog 26 as mentioned under (d);

(f) There being means for automatically stopping the machine, as soon as the creasing tool or tools and the reciprocator 22 have operated alternately a predetermined plurality of times, in other words, as soon as the rotation of sleeve-structure 21 with gear 25 has resulted in imparting a predetermined angularity of bend to a pipe length,—these automatic means here including a cam 32 on a gear in a subsidiary gear train including a gear 33 fixed to and rotating with sleeve-structure 21,—this cam 32 encountering, when the predetermined number of creases have been performed on the pipe length then in the machine, a roller 34 on a pivoted arm 35. It is thus observed that the cam 32 serves as an element for signaling the performance of a certain predetermined number of creases, and at the same time, initiating the operation of a series of devices, all of which cooperate to bring about the automatic stopping of the machine. This arm is then uplifted at an end to which is attached one end of a cable 36 the other end of which is connected to a member 27 of the pin-and-detent group mentioned under (d), and which member is a pivotally suspended blade having a flat bottom now seated on the member 28 of said group, here a pin 28,—with the result that said blade 27 is pulled away from said pin 28 in a manner to permit the treadle 31 to return to starting and normal machine-running position,—which upward movement of the treadle results in a resetting of the dog 26 to bring about instantly an unclutching of gear 25 and sleeve-structure 21 and so a halting of the machine;

(g) The clutch already referred to including a plurality of slidable dogs 37 so arranged as to present projections 37' whirling, for a short period of time due to the continued rotation of sleeve-structure 21 under momentum only, through a circular path within which is normally extended a device 38 movable under the impact resulting from any one of such projections attempting to pass same,—said projections only traveling in said path when said slide dogs are moved to unclutch gear 25 from sleeve-structure 21,—said device 38 when thus moved, at once (1) unlatching, as by a cable 39 and a slide-rod 40, the aforesaid cam 30 to permit say a weight 41 to cause relative movement between the sections of the working-head to open up the latter as above described, and (2) opening a latch 42 for bringing about a release of certain locking means up to this point holding a pipe-feeding carriage 43 to be stepped along reciprocator 22 a definite amount at each forward stroke of the latter but preventing said carriage from ever sliding back along said reciprocator,—thereby permitting a suitable instrumentality as a weight 44 to completely retract carriage 43 to a predetermined starting station, such station so equipped, as by the means indicated at 45, that the just mentioned locking means is automatically restored;

(*h*) Thus providing a machine having the outstanding structural and operative advantages, among others, of (1) a power-input means continuously running,—(2) an arrangement such that at the conclusion of a pipe bending operation the variable working-head preferably incorporated, and carriage 43 are, respectively, opened abnormally, and returned to starting position, only after all the other parts of the machine are brought to rest,—(3) an arrangement such that by merely changing the gear ratio of the subsidiary gear train above mentioned under (*c*), (say as between said gear 33 and a gear 46 which drives the gear carrying the above mentioned cam 32 in the machine illustrated in the drawings as a preferred embodiment of the invention), the said cam or an equivalent will stop the machine as above described when a pipe length in the machine has been given a predetermined number of creases, it becoming clear hereinafter that if said cam ratio is ten to one, or eight to one, or $n$ to one, said predetermined number of creases will be ten, eight or $n$, this arrangement obviously providing an easy, convenient and exceedingly quick means for at will resetting the machine to automatically stop and consequently cease bending any pipe length thereafter placed in the machine and subjected to its operation;—and (3), when desired, a single actuator, as the treadle 31, is so connected that a single depression thereof will (on the down stroke of the pedal), first close the previously separated sections of the working-head and restore the latch 42 or an equivalent to a condition to hold its locking-means or equivalent out of the path of forward travel of carriage 43, and thereafter, say as the pedal reaches near the limit of its down stroke, start the machine by actuating dog 26 as above described, and thereafter, (on the up stroke of the pedal, commencing as soon as foot pressure is removed therefrom) automatically latching the parts 27 and 28, so that the pin 28 is caught by and stopped against the flat bottom of blade 27 and remains in that position, the part 42 meanwhile remains latched and the part 40, by way of a latch bolt at its forward end, meanwhile holds the working-head from being opened in response to the pull of weight 41,—until cable 36 is pulled to free treadle 31 to rise to the upper limit of its up stroke by the riding of cam 32 under roller 34, as above described under (*f*); which latter operation, as just described under (2), does not occur until the predetermined number of creases have been made in the pipe length then being subjected to the machine,—it being recalled again at this point, as also above described under (*e*), that the just mentioned rising of the treadle to its uppermost position, has operated dog 26 to unclutch sleeve-structure 21, to stop the machine, and that, incidental to such stoppage, the slide-dog equipment of the clutch has moved the device 38 to unlatch member 44, and to withdraw the latch holding the working-head from being separated by a drop of weight 41.

The foregoing completes the preliminary survey hereinabove introduced.

Referring now in more detail to the embodiment of the invention shown in the accompanying drawings, the aforesaid pulley 20 is fixed on a short horizontal shaft 47 extended lengthwise of the machine and journalled in suitable brackets carried by the rear two of the three cross-frames 48, 49 and 50 which constitute the main vertical supporting elements of the machine. On said shaft 47 is also fixed a spur-gear 51, meshing with a larger gear, the aforesaid gear 25.

For the purposes of this description, gear 25 is assumed to be rotating in a counter-clockwise direction as seen in Fig. 4, that is, as indicated by the arrowhead A and arrow-tail A' appearing in Fig. 1.

Said gear 25, as seen best from Fig. 5, is loose on the aforesaid sleeve 21, and hence this gear may continuously rotate relative to the sleeve unless and until the gear 25 is suitably coupled to the latter.

Interposed between said sleeve 21 and the aforesaid reciprocator 22 is a bearing 52. The reciprocator may be actuated within the bearing, at the proper times, and the sleeve may rotate about the bearing, at the proper times. To restrain the reciprocator against any rotation whatever, the same is feathered inside bearing 52 as indicated at 53.

Still referring to Fig. 5, sleeve 21 has an internal cam-groove 24ª adapted to co-act with the aforesaid follower 24 secured to the reciprocator, thereby to move the reciprocator back and forth once during each half revolution of the sleeve. Also the sleeve 21 has an external cam-groove 23ª for co-acting with the aforesaid follower 23; this follower being on the lower end of a rock-lever 54 pivoted on a bracket 55 on frame 49, and actuating, through parts to be described in the next paragraph, the creasing tools. Said cam-groove 23ª is likewise designed to give rock-lever 54 a complete back and forth movement once every half revolution of sleeve 21. It will be observed from a comparison of the broken line, and a dot-and-dash line, showings, of these cam-grooves in Fig. 5, that while reciprocator 22 is making a back and forth movement, lever 54 is still, and while lever 54 is making a back and forth movement, reciprocator 22 is motionless; and that each still or motionless period for either of these actuators 22 and 54 is measured by a full half revolution of sleeve 21.

The creasing mechanism includes three creasing tools best shown in Fig. 6, at 56, 57 and 58; these tools being simultaneously moved to full-creasing position, and being simultaneously retracted therefrom, by, respectively, a movement of rock-lever 54 from the position shown in Fig. 1 to the position shown in Fig. 5, and a reverse movement of said rock-lever. To these ends, the upper end of lever 54 is pivotedly connected to a link 59, adjustable as to length by a turn-buckle 60; the other end of which link is forked as indicated at 59' in Fig. 6, and there interpivoted with a set of toggle-links 61. The upper ends of the upper links 61 are pivoted to frame 50 as indicated at 62, while the lower end of the lower link 61 is pivoted to the upper portion of a vertically slidable plate 63, suitably guided on frame 50, and integrally carrying tool 56 formed at its lower portion to provide a downwardly movable creasing edge. Frame 50 includes an upper frame proper, an intermediate wall-structure 50', and a lower pedestal portion 50''. The other two creasing tools complementing the creasing tool 56 of the machine illustrated in the drawings, to-wit, the identical tools 57 and 58, are pivoted at 57ᵃ and 58ᵃ, respectively, on pedestal 50''; are held to uniplanar movement over structure 50' by guides 64; and are operated to have simultaneous inswinging and outswinging movements, at the same time tool 56 is having downward and upward swinging movements, due to the provision of links 65 pivoted at their upper ends to plate 63 and interpivoted at their lower ends with toggle-links 66—the outer ends of the outer ones of the links 66 being pivoted to said wall-structure 50', and the inner ends of the inner ones of said links 66 being pivoted to the upper outer ends of the swinging tools 57 and 58.

Comparing now Figs. 1, 6, 3 and 10, it will be clearly seen that on each forward thrust of the link 59, a pipe, indicated at P in Fig. 3, will be given substantially a crescent-form crease $p'$, this crease having an arcuate length measured by the length of an incompletely girthing varying-depth pocket or recess 67 in a drum 68; and that, on the immediately following return-stroke of said link 59 (note the cam-groove 23ᵃ as shown in Fig. 5) all the creasing tools will be cleared out of said pocket and away from drum 68, to permit the latter to move toward the rear end of the machine, thereby to flatten the crease $p'$ to the condition indicated at $p''$ (the previously formed crease). It will be further noted from such cam-groove showings in Fig. 5 that it is immediately following the conclusion of such stroke of link 59; that the reciprocator will commence its back and forth movement, to move the drum 68 away from the position shown in full lines in Fig. 3 to the position indicated in broken lines at 68', and then to return the drum to said full line position.

Referring to Figs. 1 and 3, and more particularly to Figs. 7, 8 and 9, the aforesaid carriage 43 is shown as including extensions 43', projected horizontally on both sides of that central or main portion of the carriage which sleeves reciprocator 22, and toward two round guide rods 69 fixed in position on the machine parallel to and within the same horizontal plane as the reciprocator. The upper surface of the reciprocator, for an appropriate length thereof, is notched as indicated at 22' in Figs. 7 and 9, to constitute the reciprocator a rack of such type that when a pawl 70 carried in an upper part of the carriage is in its normally lowered position as illustrated in Fig. 9, each forward stroke of the reciprocator will give the carriage a similar and equal stroke. In order, however, that the next succeeding stroke of the reciprocator, which is obviously a stroke in the opposite direction, shall not retract the carriage 43, at all, but instead be merely a rearward movement of the reciprocator relative to the carriage throughout the stroke, the following parts are provided: Each of the extensions 43' of the carriage is coupled as best shown in Figs. 7, 8 and 10, with one of two auxiliary carriages 71 each restrained against any movement relative to the carriage 43 other than a rocking movement. These auxiliary carriages 71 are not here shown as actually connected to carriage 43 by pivot-studs or the like; however, they are in effect thus pivoted to carriage 43 by virtue of their projections 72 movable in accommodating recesses 73 in extensions 43, and by virtue of projections 74 rigid on extensions 43' but movable in their accommodating recesses 75 in auxiliary carriages 71. These auxiliary carriages have bores for sleeving the fixed guide rods 69, which bores are shaped as clearly shown in broken lines in Fig. 7. In other words, as made plain in Fig. 8, these bores will be spaced from rods 69 all around the latter while the parts are arranged as shown in Fig. 7, that is, while the carriage 43, through the projection 74 is exerting pressures against the forward walls 75' of recesses 75, during a forward movement of the carriage accompanying a forward stroke of reciprocator 22. When, however, at the commencement of a return or rearward stroke of reciprocator 22, the first frictional back pull on carriage 43 occurs, this pull will be translated into a push against the forward ends of the properly adjusted set-screws 76 on the auxiliary carriage 71, and thereupon instantaneously, such carriages will rock as though about fulcrums and against the pull of springs 77, immediately to clinch-lock the auxiliary carriages to the fixed guide rods 69, and hence permit the retraction stroke of reciprocator 22 to occur throughout its length while carriage 43 is held motionless. The theory and mode of operation of the parts just described is also very clearly described in the U. S. patent to Naylor No. 1,032,152, hereinabove referred to.

Adverting for a moment to Fig. 1, a control bar 78, partially shown in dot and dash lines in Fig. 9, is illustrated as being, during forward travel of carriage 43 along its guide bars 69, held by the aforesaid latch 42 in an elevated position out of all possible contact with a release device for the pawl 70. This device comprises a rounded stem 79 offset from the upper rear end of a lever 80 pivoted at 81 and having a variously rounded toe 82 riding under an anti-friction roller 83 set in a slot 84 in a portion of the pawl above carriage 43; from which it will be clearly seen that upon dropping control bar 78 to the dot and dash indicated position shown in Fig. 1,—which will predeterminedly occur when the prevised number of creases have been imparted to the pipe-length then in the machine, the pawl will be lifted to clear the crests of the rack-teeth cut along the top portion of reciprocator 22. The only thing now needed to be done (to free carriage 43 for a full-sweep, instantaneous return to the position it should occupy for the initiation for the next pipe creasing cycle, which position is that predetermined by the setting of the aforesaid adjustable stop 45) is to positively adjust the auxiliary carriages 71 on carriage 43 as shown in Fig. 7. To this end, lever 80 has a pair of oppositely offset extensions 85 carrying pendent terminal blades 86; the parts being so arranged that when lever 80 is rocked by control bar 78 to elevate pawl 70 as just described, plates 86, beveled at their bottoms as shown in Fig. 9, will be easily forced down between the facing walls of extensions 43' on carriage 43 and the inwardly directed extensions on auxiliary carriages 71 which carry set-screws 76, thus to lock carriage 43 and the auxiliary carriages 71 together as shown in Fig. 7. In order that this simultaneously accomplished releasing of pawl 70 from rack 22', and of auxiliary carriages 71 relative to fixed guide rods 69, shall persist until carriage 43 is snapped back to its initial position as determined by stop 45, control bar 78 is sufficiently long, and heavily weighted as at 78'. Thus, due to the fact that control bar 78 is of the proper length, immediately after latch 42 is swung on its pivot 87 to release the control bar 78, the carriage 43 is returned to its aforesaid initial position,—in the present case by the aforesaid weight 44, which is shown as being suspended at one end of a cable 88 passing over a sheave 89 and connected at its other end, as at 90, to carriage 43.

Referring now particularly to Figs. 1, 3 and 6, the working-head here employed includes a fixed upper half 91, and a movable lower half 92, the latter having the range of movement indicated in broken lines in Fig. 6 and being guided for such movement in suitable ways in wall structure 50'. Said lower half 92 is permitted to drop to a ledge 93, or is elevated to cause its upper end portions 92' to bear against the lower end portions 91' of half 91, by the aforesaid cam 30; which cam, with a grooved disk 94, is fixed on a stub-shaft 95. The rear face of the disk is notched as indicated at 96, and in the groove of the disk is laid a cable 97 secured at a point intermediate its length to the disk as indicated at 98, such cable at one end suspending the aforesaid weight 41 and at its other end being secured to a slide-rod 99 guided in a bracket 100 and pivoted at its lower end to the aforesaid treadle 31.

Treadle 31 is itself fulcrumed at 101; and beyond such fulcrum is connected to one end of a cable 102 passing over a sheave 103; the other end of this cable being connected to the lower end of the aforesaid dog 26, which dog is normally urged toward entering a peripheral groove 104 around sleeve 21, by an expansible coil spring 105 in a bracket 106 on frame 48, which bracket also provides a guide for said dog 26.

Dog 26, all the while it is projected by said spring into said groove, is in position to engage (as shown clearly in Fig. 5) slots 107 in the aforesaid slide-dogs 37 and thus maintains these slide-dogs removed from their receiving recesses 108 in gear 25, and so breaks, by overcoming the urge of the coil springs 109 within the slide dogs 37, the driving connection between gear 25 and sleeve 21.

The endwise movements of slide-dogs 37 incidental to this unclutching operation, project the tail-portions 37'' of the dogs into the space between the aforesaid gear 33 and frame 48; these portions 37'' being beveled as shown most clearly in Fig. 5; and, therefore, the next thing that happens, instantly, is the engagement of one of said tail-portions with the illustrated beveled end of the aforesaid slide device 38.

Said slide device, disposed in a suitable guideway formed in frame 48, has a flanged rear-head 38' contacting a lever 110 pivoted at 111 on a bracket 112 on frame 48. At a point intermediate its ends, this lever 110 is connected to one end of the aforesaid cable 39, which cable, passing over sheaves 113 and 114 pivoted on frame 49, has its other end connected to the aforesaid slide-rod 40, guided in suitable bearings 115 and 116, and carrying at its forward end a pivotedly connected spring latch 117, having an end, bevelled as shown, seated in notch 96, of disc 94 to hold cam 30 as shown in Fig. 6, and thus to close the working-head 91—92 all the time a pipe length in the machine is being creased.

Pivoted at an intermediate point 118 to a bracket 119 on frame 49, is a lever 120 connected at its upper end to latch 42 by a link 121, and pivoted at its lower end to the aforesaid slide-rod 40.

Such latch 42 terminates at its lower end in a hook for holding a pin on the aforesaid control-bar 78; the parts being so designed that when arranged as shown in Fig. 1, the control-bar cannot drop free, except by a rocking of lever 120, and cannot be thereafter elevated to be latch-locked as shown except by a depression of treadle 31 and a consequent descent of slide 99, this slide being connected as shown to said control-bar by a cable 123 passing over a sheave 124 pivoted on a bracket 125 on front frame 50.

The aforesaid gear 33 meshes with a gear 126 rotated with a pinion 127; this pinion meshing with a gear 128 fixed on the same stub-shaft 129, passing through frame 48, on which is fixed the aforesaid gear or pinion 46. This gear 46 is a member of a train of gears on the rear side of frame 48, for driving at a predetermined speed ratio relative to gear 33, a disc 130 on a shaft 131 carrying the aforesaid cam 32 as a cam-nose on the cam really constituted by the disc 130. It should be clear, or it will become clear hereinafter, that if the speed ratio as between gears 46 and 33 is 10 to 1, or 8 to 1, or $n$ to 1, the machine once started, will rotate the sleeve 10 times, or 8 times, or $n$ times, and hence will impart to the pipe in the machine ten, or eight, or $n$, creases, for each complete revolution of cam 130—32.

Now, each time disc 130 completes one revolution, each such revolution being started when a new pipe length is inserted into the machine and the machine is started to crease the pipe, the cam-nose 32 will ride under and lift the aforesaid roller 34, which, as aforesaid, is journalled on an arm 35. This arm is pivoted at 133 on frame 48 and is connected at its free end to one end of the aforesaid cable 36 which passing over a sheave 134 journalled as indicated at 135, has its other end connected as aforesaid to the aforesaid pivotally pendent latch-blade 27, pivoted at 135' to bracket 100 on frame 50. As already brought out, a pull on cable 36 swings blade 27 to the right in Fig. 1, to clear its flat bottom from a top pin 28 on treadle 31 (which is the latched relation of these parts, as already explained, while the machine is operating to impart creases to a pipe length),—thus releasing a return spring 136 for treadle 31, to move the treadle up to extreme elevated position, and thereby in turn to give slack to cable 102, to permit dog 26 to reenter groove 104 on sleeve 21 and thus act on slide-dogs 37 to unclutch the sleeve from the continuously rotating gear 25, as above described, and consequently to cease pipe creasing.

Of course, any convenient number of slide-dogs 37 may be employed, but preferably, as is familiar in various machine arts, three such dogs are present, spaced 120 degrees apart around sleeve 21, and consequently there are three notches 108 on the sleeve similarly spaced therearound.

The drive from gear 46 to cam-disc 130 is by way of an idler-gear 137 to a gear 138 fixed on the same stub-shaft 131 on which is fixed the cam-disc 130. It will therefore be clear that to set the machine for giving any desired number of creases it is only necessary to replace the gear 46 on pivoted arm 35 by a substitute gear having a different number of teeth; the idler-gear 137 being adjustably journalled on an arm 139 pivoted at 140 on the rear face of frame 48; this adjustable journalling being indicated at 141. Consequently, a gear of any selected pitch may be substituted for gear 46, without replacing gear 137; but merely as the result of adjusting the journalling of gear 137 suitably along slot 141 and by otherwise adjusting the parts for a perfect mesh simply by swinging lever 139 the required amount about its pivot 140. It is to be understood that upon replacement of gear 46 by a gear having a different number of teeth disposed thereon, the cam 32 will be caused to co-act with roller 34 at different times, dependent on the number of teeth on the gear which will serve as member 46 of the machine.

The remaining structural details of the machine illustrated, such, for instance, as the tie-rods 142, are relatively unimportant.

Therefore, this specification may now be concluded with a brief summary of operation, viz:

Referring to Fig. 1, it will be understood that stop 45 is adjusted and set on its bracket 119 so that when automatically at the conclusion of a predetermined pipe-bending operation explained, the carriage 43 is backed up against such stop, the next manual insertion of a new pipe-length to mount its inner end on the reduced portion 143 (Fig. 9) of the carriage, will set the new pipe-length in the machine so that the creasing shall begin as prevised a certain distance from the inner end of the pipe.

Assume now that the carriage 43 is, as aforesaid, all the way back against the stop 45, and assume that the treadle is all the way up, as shown in full lines in Fig. 1.

At this time, therefore, control-bar 78 will be elevated as shown, and weight 44 will be holding working-head 91—92 open, (Figs. 3 and 6), the latch 117 being thrust to the right in Fig. 1 because out of notch 96 in disc 94. The creasing tools will be in retracted position (Fig. 6) and cam-nose 32 (Fig. 4) will be just beyond roller 34.

Therefore, as a very easy and quick operation, a pipe length may be inserted past the creasing tools, through the expanded working-head, over the drum 48, and along reciprocator 22 to seat the rear end of the pipe properly around support 143 (Fig. 9) against carriage 43.

Now, if a single treadle depression be performed, the following things occur in the following order:

As the treadle moves from its uppermost full-line position toward and into an intermediate broken line position, slide 99 is drawn down, and disc 94 is rotated against weight 41 until latch 117 snaps into notch 96 (Fig. 3), and the working-head is closed and lock closed. While this is being done, the accompanying pull on cable 123 is lifting control-bar 78 to latch the parts as shown in Fig. 1, and consequently to release the parts of Figs. 7, 8 and 9 for the already fully and clearly explained step-by-step forward feed of the carriage and pipe length toward the creasing tools, on each back and forth movement of reciprocator 22.

Before the treadle reaches its lowermost point, the dot-and-dash position of Fig. 1, dog 26 is withdrawn from the peripheral groove 104 on sleeve 21, and said sleeve starts to rotate with the continuously rotating gear 25,—the machine thereupon commencing its alternate pipe feeding and pipe creasing operations as already described in detail, until the predetermined number of creases are given to the pipe.

Following the releasing of foot pressure on treadle 31, the treadle moves upwardly under its spring 136, but not all the way, being caught in the aforesaid (broken-line, Fig. 1) intermediate position, by blade 27 coming into the upward path of pin 28, due to the presence of retractile spring 28'. The result is that for the time being dog 26 is not permitted to re-enter groove 104 on sleeve 21 sufficiently to unclutch the sleeve from gear 25.

As soon, however, as there is completed on the pipe the last of the predetermined number of creases, cam 32 comes again under roller 34, and by way of cable 36 blade 27 is cleared away and the treadle is permitted to return to normal or elevated position.

Thereupon, several things occur, and in an ideal order. The dog 26 re-enters groove 104 and acts on slide-dogs 37 to unclutch sleeve 21 from gear 25, thus insuring that practically immediately thereafter the machine will stop. At the same time, cable 97 is given slack to prepare for an expansion of the working-head, and cable 123 is given slack for to prepare a dropping of control-bar 78. Finally, the projection 37" on a slide-dog 37 (sleeve 21 still rotating, but under momentum, purely) will engage device 38, and thereupon rock lever 110 to simultaneously accomplish two other purposes, both needed to reset the machine for another pipe creasing operation, and both ideally occurring after stoppage of operations of the creasing tools and the reciprocator. That is to say, now, due to the outswinging of lever 110, latch 117 is withdrawn from disc 94, and the working-head opens under pull of weight 41; and latch 42 is swung to the left in Fig. 1, permitting the weighted control-bar 78 to drop to the broken line position shown in Fig. 1 thereby to actuate the lever 80 of Figs. 7, 8 and 9 to set the pawl 70 and the auxiliary carriages 71 as above described to a condition resulting in the immediate slam-back return, by weight 44, of carriage 43 to its initial position against stop 45.

It will thus be seen that there has been provided a machine having all the unique features hereinabove first mentioned, and capable of satisfying all the objects and incorporating all the advantages hereinabove discussed; and a machine, moreover, exceedingly simple, rugged, and dependable, yet quickly and easily variable as to any one of a wide variety of possible uses contemplated.

What I claim as new, is:

1. In a machine of the kind described, the combination with pipe advancing means, pipe creasing means, and operative connections between the two means just mentioned for permitting their operation in a predetermined time relation, of pipe supporting means in the vicinity of the zone of operation of said creasing means, said pipe supporting means incorporating a working-head including a plurality of relatively movable sections, and there being means for predeterminedly adjusting said sections so as to support the pipe during a creasing operation by lying in a predetermined adjacency to the exterior of the pipe substantially all around the same, and means for predeterminedly giving movement to said sections to space them abnormally to facilitate the insertion of a new pipe in the machine for bending.

2. In a machine of the kind described, the combination with pipe advancing means, pipe creasing means, and operative connections between the two means just mentioned for permitting their operation in a predetermined time relation, of pipe supporting means in the vicinity of the zone of operation of said creasing means, said pipe supporting means incorporating a working-head including a plurality of relatively movable sections, and there being means for predeterminedly giving relative movement to said sections to space them abnormally to facilitate the insertion of a new pipe in the machine for bending.

3. The machine defined in claim 2, wherein the predetermination last mentioned is consummated by another working part of the machine attaining a certain condition relative to a prevised operation thereof.

4. In a machine of the kind described, the combination with pipe advancing means, pipe creasing means, and operative connections between the two means just mentioned for permitting their operation in a predetermined time relation, of pipe supporting means in the vicinity of the zone of operation of said creasing means, said pipe supporting means incorporating a working-head including a plurality of relatively movable sections, and there being means for predeterminedly moving said sections into a closer adjacency to improve the support of the pipe during a creasing operation, the predetermination last mentioned being effected by another working part of the machine attaining a certain condition relative to a prevised operation thereof.

5. The machine defined in claim 2, wherein means are provided for automatically thus spacing said sections when a pipe has been bent to the extent to make the pipe ready for extraction from the machine.

6. In a machine of the kind described, the combination with pipe advancing means, pipe creasing means, and operative connections between the two means just mentioned for permitting their operation in predeterminedly timed relation, of pipe supporting means in the vicinity of the zone of operation of said creasing means, said pipe supporting means incorporating a working-head including a plurality of relatively movable sections; said sections being adjustable so as to support the pipe during a creasing operation by lying in a predetermined adjacency to the exterior of the pipe substantially all around the same, and to become spaced from each other between the bending of different pipes; an actuator functionable at will for initiating a pipe creasing operation relative to a pipe previously inserted in the machine; and means predeterminedly operated and automatically controlled by said actuator, in predetermined time relation to the initiation of the creasing of a certain pipe, to restore to the condition first mentioned, the sections of said working-head spaced from each other on completion of the creasing of a previous pipe.

7. In a machine of the kind described, the combination with pipe advancing means, pipe creasing means, and operative connections between the two means just mentioned for permitting their operation in predeterminedly timed relation, of pipe supporting means in the vicinity of the zone of operation of said creasing means, said pipe supporting means incorporating a working-head including a plurality of relatively movable sections; said sections being adjustable so as to support the pipe during a creasing operation by lying in a predetermined adjacency to the exterior of the pipe substantially all around the same, to become spaced from each other between the bending of different pipes; an actuator functionable at will for initiating a pipe creasing operation relative to a pipe previously inserted in the machine; and means predeterminedly operated and automatically controlled by said actuator, in predetermined time relation to the completion of the creasing of a pipe being bent, to space the sections of the working-head to prepare the machine for the easy and quick insertion of a subsequent pipe.

8. In a machine of the kind described, a sleeve-structure, a sleeve-driver, means for continuously driving said driver, means for coupling and uncoupling said driver to said sleeve-structure for rotation therewith and for rotation relative thereto, a carriage structure for advancing the pipe toward a creasing zone, a creasing mechanism having an operative connection to said sleeve, a reciprocator for operating the carriage also having an operative connection to said sleeve, one of said instrumentalities being a cam groove on the exterior of the sleeve-structure and the other of said instrumentalities being a cam groove on the interior of the sleeve-structure.

9. In a machine of the kind described, a sleeve-structure, a sleeve-driver, means for continuously driving said driver, means for coupling and uncoupling said driver to said sleeve-structure for rotation therewith and for rotation relative thereto, a carriage structure for advancing the pipe toward a creasing zone, a creasing mechanism having an operative connection to said sleeve, and a reciprocator for operating the carriage also having an operative connection to said sleeve, wherein said operative connections include instrumentalities controlled by said sleeve structure during operation of the latter to predetermine that, in alteration, the creasing mechanism is advanced to the work and withdrawn therefrom while the carriage is motionless and the carriage is advanced toward the zone of operation of the creasing mechanism while the latter is withdrawn from the work.

10. In a machine of the kind described, the combination of means for performing a plurality of creasing operations on a pipe and spaced longitudinally thereof thereby to give the same a desired bend, means for advancing the pipe lengthwise alternately with said creasing operations, and means for signaling the completion of a predetermined number of creasing operations on a particular pipe length then in the machine.

11. In a machine of the kind described, the combination of means for performing a plurality of creasing operations on a pipe and spaced longitudinally thereof thereby to give the same a desired bend, means for advancing the pipe lengthwise alternately with said creasing operations, means for signaling the completion of a predetermined number of creasing operations on a particular pipe length then in the machine, and means for adjusting said signal to operate relative to a predetermined total of creasing operations on said pipe and including a plurality of co-acting parts only one of which parts is required to be replaced to set the signal to operate on completing a different predetermined total of creasing operations relative to a pipe thereafter subjected to the machine for a bending operation.

12. In a machine of the kind described, the combination of means for performing a plurality of creasing operations spaced longitudinally of a pipe thereby to give said pipe a desired bend, means for advancing the pipe lengthwise alternately with said creasing operations, means for signalling the completion of a predetermined number of creasing operations on said pipe in the machine, and means for readjusting said signal to operate relative to another predetermined total of creasing operations and including a gear train variable for the purpose intended on removing and replacing one gear therein.

13. In a machine of the kind described, the combination of means for performing a plurality of creasing operations spaced longitudinally of a pipe, thereby to give said pipe a desired bend, means for advancing the pipe lengthwise alternately with said creasing operations, and means for automatically stopping operation of the two means first mentioned on the completion of a predetermined number of creasing operations on said pipe, said last-named means including a manipulator for starting the machine, said manipulator being movable in a single direction, thereby automatically to cause the commencement of creasing operations relative to a pipe in the machine to supervise the giving of a predetermined number of creases to said pipe and thereafter to cease such creasing operations and dispose and maintain motionless all the normally moving parts of the machine, as so disposed and maintained, said parts being in locations giving maximum facility for the withdrawal of a bent pipe and the insertion of a new pipe.

14. In a machine of the kind described, the combination of means for performing a plurality of creasing operations spaced longitudinally of a pipe, thereby to give said pipe a desired bend, means for advancing the pipe lengthwise alternately with said creasing operations, and means for automatically stopping operation of the first two means first mentioned on the completion of a predetermined number of creasing operations on said pipe, the said last-named means, including a manipulator for starting the machine, said manipulator being movable in a single direction, thereby automatically to cause the commencement of creasing operations relative to a pipe in the machine, to supervise the giving of a predetermined number of creases to said pipe, and thereafter to cease such creasing operations and dispose and maintain motionless all the normally moving parts of the machine, as so disposed and maintained, said parts being in locations giving maximum facility for the withdrawal of a bent pipe and the insertion of a new pipe, the parts last mentioned including a working-head having separable sections and said manipulator being so operatively connected with one of said sections that with said sections disposed in a maximum predetermined adjacency for facilitating pipe bending, said sections are automatically abnormally separated on the completion of the predetermined bending of a pipe and said sections are automatically restored to said adjacency relative to another pipe inserted for bending in time to facilitate the first creasing operation performed on the latter.

In testimony whereof I hereby affix my signature.

JOSEPH GEORGE TILP.